Jan. 31, 1967 G. W. COOK 3,301,510
METHOD AND APPARATUS FOR GAGE SIMULATION
IN AUTOMATIC CONTROL SYSTEMS
Filed Nov. 1, 1963 3 Sheets-Sheet 1

INVENTOR.
GEORGE W. COOK
BY
Curtis, Morris & Safford
ATTORNEYS

INVENTOR.
GEORGE W. COOK
BY
Curtis, Morris & Safford
ATTORNEYS

United States Patent Office 3,301,510
Patented Jan. 31, 1967

3,301,510
METHOD AND APPARATUS FOR GAGE SIMULATION IN AUTOMATIC CONTROL SYSTEMS
George W. Cook, McLean, Va., assignor to Thiokol Chemical Corporation, Bristol, Pa., a corporation of Delaware
Filed Nov. 1, 1963, Ser. No. 320,682
5 Claims. (Cl. 244—77)

The present invention relates to a method and apparatus for gage simulation in automatic control systems adapted for providing control and guidance of a wide variety of different types of craft.

Among the many advantages of the present invention as embodied in an automatic control system are those resulting from the fact that it enables the creation of an analogue control voltage which appears to have originated from an angular velocity motion sensing device even though this devices does not actually exist in the system. This "phantom" analogue control voltage is then used in the control system to produce a marked improvement in the performance and operation of the system. Moreover, this "phantom" analogue control voltage appears to have originated from an angular velocity gage having properties approaching those of a perfect transducer. Consequently, the presence of a substantially perfect angular velocity gage is simulated, and the resulting signal which is created is used to advantage in the control system.

It is an object of the present invention to improve the performance of automatic control and guidance systems.

It is a further object of this invention to provide for the simulation of an angular velocity gage having properties approaching those of a perfect gage in automatic control and guidance systems.

In this specification and in the accompanying drawing is described and shown a method and apparatus for gage simulation in automatic control systems embodying the invention, and it is to be understood that this disclosure is not intended to be exhaustive nor limiting of the invention, but is set forth for purposes of illustration in order that others skilled in the art may fully understood the invention and the manner of its application in practical use.

The various objects, aspects, and advantages of the present invention will be in part pointed out and in part apparent from the following description of an illustrative embodiment of this invention when considered in conjunction with the accompanying drawings, in which.

Figure 1:
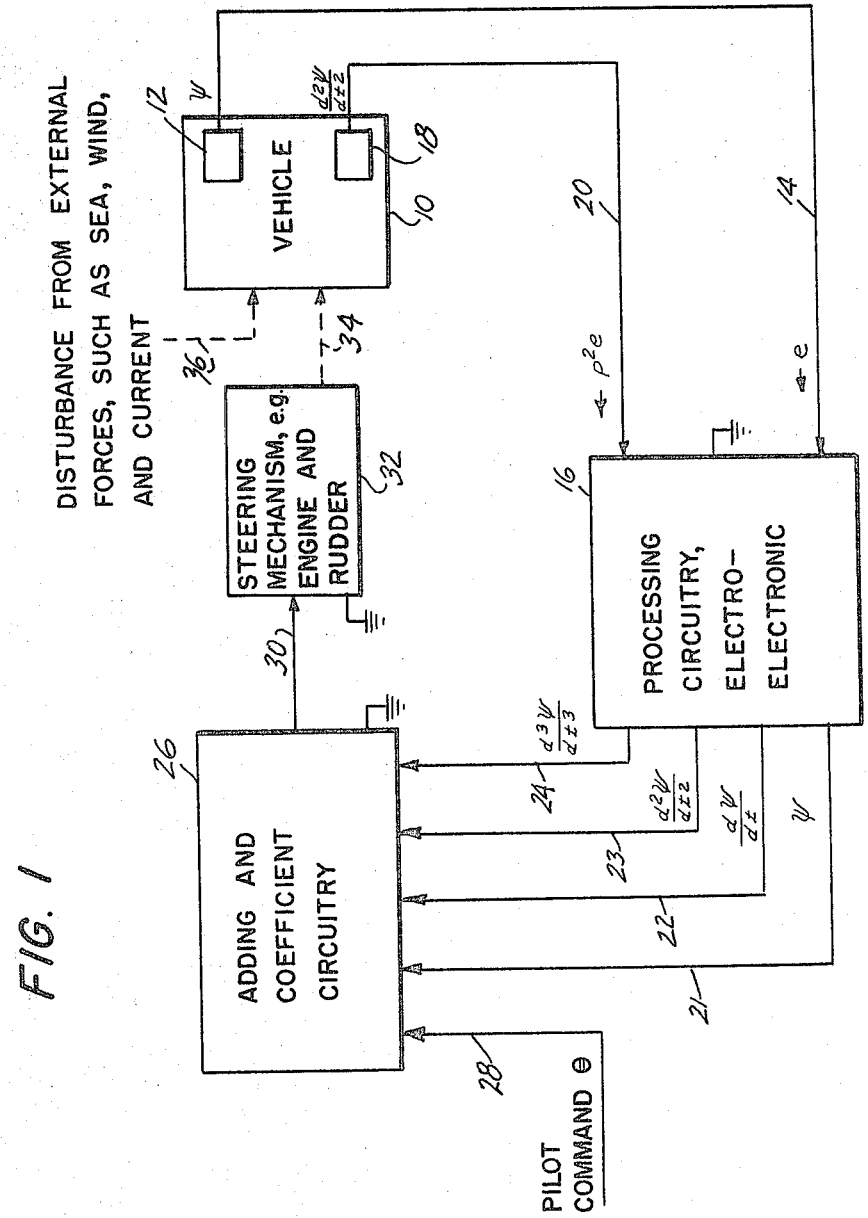
FIGURE 1 is a schematic circuit diagram of a control and guidance system for a craft moving in or upon a fluid medium.

In connection with the guidance and control of a craft, e.g. vehicle, ship, vessel or body moving on or through a fluid medium, there is a classical differential equation relating to the craft to be controlled. This equation was set forth by Dr. N. Minorski in the paper "Automatic Steering Tests" in ASNE 1930, col. XLII, pages 285–310. This differential equation is:

(1) Rudder angle $S_r = m\psi + n\dfrac{d\psi}{dt} + q\dfrac{d^2\psi}{dt} = S_1 + S_2 + S_3$ where $\psi$ is the angle of deviation (yaw) of the vehicle from its desired course; and $d\psi/dt$ and $d^2\psi/dt^2$ are the angular velocity and angular acceleration, respectively, of the deviation. The expressions $S_1$, $S_2$ and $S_3$ are component rudder angles which are defined by the relations:

(2) $$S_1 = m\psi$$

(3) $$S_2 = n\dfrac{d\psi}{dt}$$

and (4) $$S_3 = q\dfrac{d^2\psi}{dt^2}$$

In order to explain the invention it is helpful to consider the dynamic action of a craft when a disturbing torque acts upon it, tending to turn the craft aside off from its desired path. When a disturbing torque acts on a craft tending to rotate it, its rotation can be prevented only by imposing a countertorque that is precisely equal and opposite to the disturbing torque. Because the disturbing torque must first induce an angular acceleration of the craft in order to rotate it, the primary countertorque should be proportional to the angular acceleration; and if it is not, then the craft will rotate. For this reason it is noted that a primary sensor in control and guidance systems of the type described herein is an angular accelerometer.

The rudder mechanism which is used to produce the steering action may be considered as a variable and controllable torque generator, which is operated by the steering engine in accordance with a compound-complex command signal. The control differential equation has the form:

(5) $$A_1\psi + A_2\dfrac{d\psi}{dt} + A_3\dfrac{d^2\psi}{dt^2} + A_4\dfrac{d^3\psi}{dt^3} = BS_r$$

where the respective "A" coefficients set the magnitudes of the heading, angular velocity, angular acceleration, and time rate of change of angular acceleration. This time rate of change of angular acceleration is hereinafter called "angular jerk," because this a convenient and apt term for this factor. The coefficient "B" is included in Equation 5 in order to include and account for the steering engine characteristics, which do not appear in Minorsky's equation above.

Upon initial consideration by the reader, it might appear that a single sensor showing heading of the craft may be used to guide the craft in accordance with the control Equation 5 above. In actual practice this is not the case. If only a heading sensor (compass mechanism), e.g. an angular displacement or yaw gage, is available, then a significant error in heading is required to occur in order to provide a basis for obtaining the various time derivatives thereof. In other words the craft is allowed to deviate a substantial angle from its desired course before sufficient information is accumulated to begin taking corrective action.

However, assuming that an angular accelerometer is used as a sensor, then the tendency to rotate, e.g. to deviate from desired course, is sensed immediately. Consequently, a substantial lead-time is gained in sensing the start of a heading error (deviation from course). In the case of a large heavy craft, this lead time often amounts to several seconds. Furthermore, less steering effort is required to counter a disturbing torque initially as it arises than is required to turn the craft back onto its proper course after time has elapsed so that the craft has been permitted to gain substantial angular momentum in turning aside, because this momentum must be overcome. Thus, it will be noted that the method and apparatus described herein provide a high order of steering efficiency.

In order to provide information concerning the angular deviation $\psi$ of the craft or vehicle 10 from the desired heading, a conventional gyroscope mechanism 12 is mounted on the craft 10. This gyroscope mechanism 12 includes a pickoff potentiometer which provides a voltage "$e$" on a line 14 extending to the processing circuitry, generally indicated at 16. The voltage "$e$" is proportional to the angular deviation or yaw $\psi$ from the desired course.

As mentioned above, a substantial lead time is obtained and the steering efficiency is improved by the use of an angular accelerometer. An angular accelerometer mechanism 18 is mounted upon the craft 10 and provides an output voltage "$p^2e$" on a line 20 extending to the processing circuitry apparatus 16. This voltage "$p^2e$" is proportional to the second time derivative $d^2\psi/dt^2$ of the angular deviation of the craft 10 from the desired course.

The other two physical measurements, angular velocity and angular jerk are simulated as will be explained, with the simulated angular velocity measurement being of particular interest in this system. As shown in FIGURE 1, the signals from the two sensors 12 and 18 are supplied by the respective lines 14 and 20 to the processing circuitry apparatus 16, and within this circuitry 16 two other signals are generated so that a total of four signals are fed out of the circuitry apparatus 16. These four signals are fed over the respective lines 21, 22, 23 and 24 into the adding and coefficient circuitry apparatus 26. Also, the pilot command signal is fed over a line 28 into the circuitry apparatus 26. These five signals are added and combined in the apparatus 26 so as to provide a single master control signal which is fed over a line 30 to the steering mechanism 32, which, for example, comprises a steering engine and rudder.

As indicated by the dashed arrow 34 the steering mechanism 32 applies a torque to the craft 10. Also, external disturbances, such as the sea, wind and current act upon the craft as indicated by the dashed arrow 36 applying the disturbing torque which is being overcome by this control system.

Before describing the system in detail it is thought that it will be helpful to the reader to establish definitely the meanings of the parameters used in the circuit apparatus. In the strictest sense, mechanical displacement is analogous to electrostatic flux in an electrical system, mechanical velocity is analogous to voltage, and so on. However, in actual practice electronic amplifiers are potential-operated. In other words, the current in an electronic tube or transistor is controlled by the voltage applied to the control electrode of the tube or transisor. Moreover, the transfer characteristics of various circuits are just as valid for voltage ratios as they are for electrostatic flux ratios, even though a voltage is known to be obtained by taking the time rate of change of electrostatic flux. Consequently, since voltage ratios are used throughout the control system shown in the drawings, the results obtained are precise and mathematically correct, regardless of the seeming disparity in analogous relationship.

Figure 2:
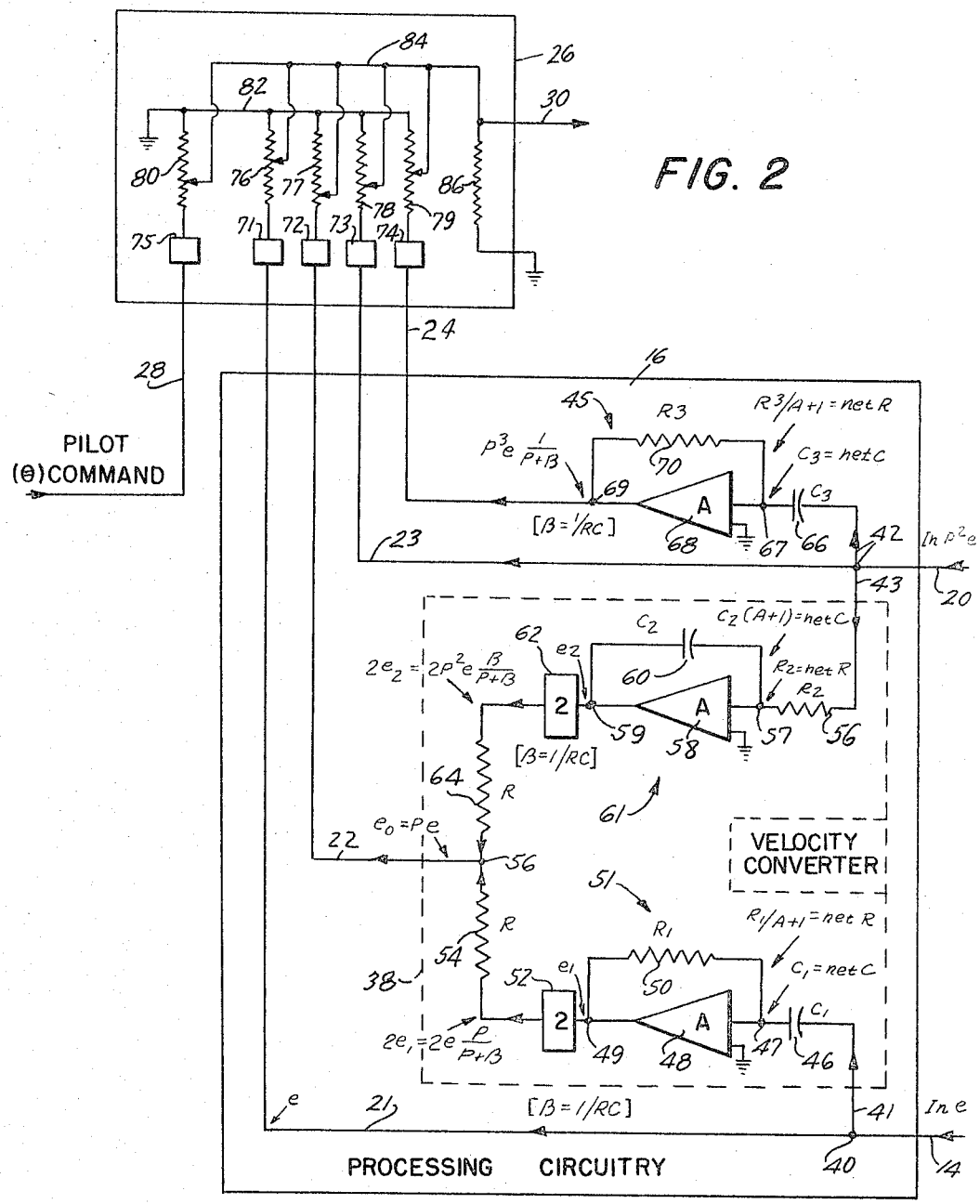
FIGURE 2 is a schematic circuit diagram showing details of a portion of the circuit of FIGURE 1.

As shown in FIGURE 2, the processing circuitry apparatus 16 includes velocity converter apparatus 38 which is enclosed within a dashed rectangle for reference. The signal voltage "$e$" is fed over from the angle sensor 12 over the lead 14 to a terminal 40 and thence over a lead 41 into one side of the velocity converter apparatus. Also from the terminal 41 the voltage "$e$" is passed on through the lead 21 into the adding and coefficient circuitry 26. Similarly, the angular acceleration signal voltage "$p^2e$" is fed through the lead 20 to a terminal 42 and thence over a lead 43 into the other side of the velocity converter apparatus 38 and through the lead 23 into the circuitry 26. From the terminal 42 the voltage "$p^2e$" is supplied through a connection 44 to a differentiating circuit 45.

The velocity converter apparatus 38 simulates the presence of an angular velocity sensor and creates a "phantom" analogue control voltage which is supplied over the line 22 to the circuitry 26. It is theoretically true that a person can obtain an angular velocity data signal by performing a time integration on the output voltage of an angular accelerometer. Theoretically, this can also be done by taking the time derivative of the output voltage from an angular displacement gage. However, for practical reasons neither of these methods yields a "pure" angular velocity signal. One of the difficulties is that all electrical integrating circuits tend to "drift," i.e. the output voltage tends to wander about in an unpredictable manner. Even the elaborate chopper-stabilized computer components still drift, and there are difficulties in their use. In addition, substantial phase errors creep into the operation unless the time-constant of the integrator is very long relative to changes occurring in the input signal. This long time constant causes the signal level to be small and the drift error to be large. Also, conventional electrical integrators tend to produce a marked phase error at low operating frequencies.

Also, similar difficulties are encountered in taking the time derivative of the angular displacement, except that errors in phase and magnitude occur at higher frequencies of the input signal, and the signal level is small at low frequencies.

These problems are overcome by the velocity converter circuit apparatus 38 which creates an angular velocity analogue voltage which appears to have originated from an angular velocity gage having properties approaching those of a perfect transducer. As shown in FIGURE 2 and also in FIGURE 3A, the lead 41 is connected into a differentiating circuit 51 including a capacitor 46 of value $C_1$ connected to the input 47 of a first operational amplifier 48 having an output terminal 49, forming the output terminal of the differentiating circuit 51. A negative-feedback resistance of circuit 50 having a value $R_1$ is connected from the output terminal 49 back to the input terminal 47. From the output terminal 49, as shown in FIGURE 2, the circuit continues through a voltage doubling amplifier 52 and through a resistance 54 of value R to a common output terminal point 56.

Figure 3A:
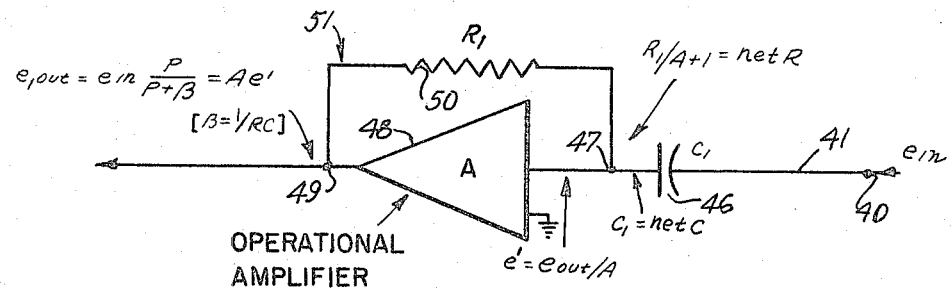
FIGURES 3A, 3B and 3C are diagrams of portions of the circuits of FIGURE 2 for purposes of explanation.
Figure 3B:
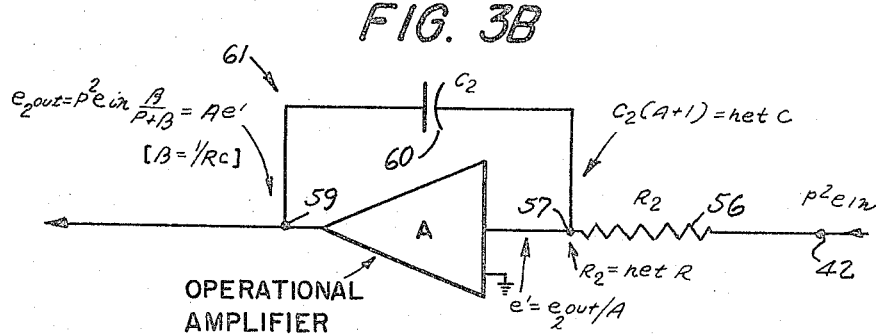

On the other side of the velocity converter, as shown in FIGURES 2 and 3B the lead 42 is connected to an integrating circuit 61 including a resistor 56 of value $R_2$ connected to the input terminal 57 of a second operational amplifier 58 having an output terminal 59, forming the output of the integrating circuit 61. A negative-feedback capacitance circuit 60 having a value $C_2$ is connected between the output terminal 59 and the input terminal 57. From the output terminal 59 the circuit continues through a voltage doubling amplifier 62 and through a resistance 64 of value R to the common output point 56. The two resistors 54 and 64 comprise an analogue adding circuit for adding the outputs of the differentiating circuit 51 and of the integrating circuit 61.

The other differentiating circuit 45 is generally similar to the circuit 51 and includes a capacitor 66 connected to the input terminal 67 of an operational amplifier 68 with an output terminal 69 and a negative feedback resistor 70 of value $R_3$ between the terminals 67 and 69.

In order to explain the advantages of the velocity converter circuit 38, attention is first directed to the operation of the electrical differentiating circuit 51 shown in FIGURES 2 and 3A. The input voltage "$e$" is proportional to angular displacement and the inverse time constant $1/RC$ is labelled B. In operational notation the output voltage is equal to the transfer function times the input or drive voltage as follows:

(6) $$e_1 \bigg] = e \frac{p}{p+B} \bigg]$$

where:

$e_1$ is the output voltage,
1 is the unit function,
$e$ is the drive voltage,
$p$ is the Heaviside operator in this case equivalent to $d/dt$, and
$B$ is the inverse time-constant $1/RC$.

In the electrical integrating circuit 61 shown in FIGURES 2 and 3B the input voltage $p^2e$ is proportional to angular acceleration, which is the second time derivative of the voltage $e$. In operational notation, the output voltage is equal to the transfer function times the drive voltage, thus:

(7)
$$e_2\bigg] = p^2e\frac{B}{p+B}\bigg]$$

where:

$e_2$ is the output voltage
1 is the unit function
$p^2e$ is the input voltage (proportional to angular acceleration)
$p$ is the Heaviside operator for $d/dt$, and
$B$ is the inverse time constant $1/RC$.

Figure 3C:
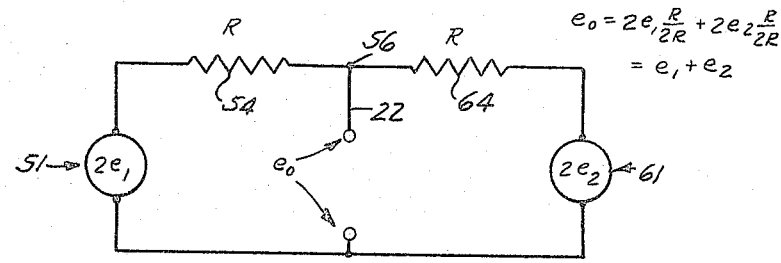

Advantageously, by adding these two output voltages from the circuits 51 and 61 together the result is a voltage proportional to angular velocity as will be explained. In FIGURE 3C is shown a simplified equivalent circuit for the velocity converter 38, where the respective output voltages have been doubled and are shown as $2e_1$ and $2e_2$. This is a non-reciprocal network; i.e., the voltage of one of the circuit sources 51 or 61 is not affected by the voltage of the other and vice-versa.

By applying the Theorem of Superposition, it is seen that the addition of the voltages $2e_1$ and $2e_2$ produces a net voltage $e_0$. The coefficient 2 is introduced to offset the attenuation in the resistance adding network 54 and 64. Thus:

(8)
$$e_0 = 2e_1\frac{R}{2R} + 2e_2\frac{R}{2R}$$

(9)
$$e_0 = e_1 + e_2$$

By direct substitution from Equations 6 and 7 into Equation 9, the result is:

(10)
$$e_0\bigg] = e\bigg[\frac{p}{p+B}\bigg]\bigg] + \bigg[p^2e\frac{B}{p+B}\bigg]\bigg]$$

By "algebrizing" and simplification:

(11)
$$e_0\bigg] = pe\bigg[\frac{pB+1}{p+B}\bigg]\bigg]$$

where $pe$ is recognized as $de/dt$, a voltage which is proportional to angular velocity.

By assigning a special value to $B$ such that:

(12)
$$B = \frac{1}{B} = 1 = RC$$

the bracketed operational term becomes:

$$\bigg[\frac{p+1}{p+1}\bigg]\bigg]$$

and:

(13)
$$e_0\bigg] = pe\bigg]\frac{de}{dt}(\text{or } \dot{e})$$

This is a pure voltage that is proportional to angular velocity.

The same result is seen to obtain by direct conversion from operational notation to exponential notation:

(14)
$$e_1\bigg] = e\frac{p}{p+B}\bigg] = pe\frac{1}{B}\frac{B}{p+B}\bigg]$$

(15)
$$e_2\bigg] = p^2e\frac{B}{p+B}\bigg] = peB\frac{p}{p+B}\bigg]$$

From a conversion table for operational calculus:

(16)
$$\frac{B}{p+B}\bigg] = (1 - \epsilon^{-Bt})\bigg]$$

and:

(17)
$$\frac{p}{p+B}\bigg] = (\epsilon^{-Bt})\bigg]$$

where:

(18)
$$e_0\bigg] = (e_1 + e_2)\bigg] = pe\frac{1}{B}(1 - \epsilon^{-Bt})\bigg] + peB(\epsilon^{-Bt})\bigg]$$

$$e_0\bigg] = pe\bigg[\frac{1}{B}(1 - \epsilon^{-Bt} + B^2\epsilon^{-Bt})\bigg]\bigg]$$

By assigning a special value to $B$ such that:

(12)
$$B = \frac{1}{B} = 1 = RC$$

Then, the same result is obtained as before, namely:

(13)
$$e_0\bigg] = pe\bigg]$$

And finally, it is seen that this voltage $e_0$ can also be derived by conventional impedance and current evaluation:

(19)
$$e_1(j\omega) = e\frac{R}{\frac{1}{j\omega C} + R}(j\omega) = e\frac{j\omega RC}{j\omega RC + 1}(j\omega)$$

(20)
$$e_2(j\omega) = [-\omega^2 e]\frac{\frac{1}{j\omega C}}{R + \frac{1}{j\omega C}}(j\omega) = -\omega^2 e\frac{1}{j\omega RC + 1}(j\omega)$$

(21)
$$e_0(j\omega) = \bigg[e_1 + e_2\bigg](j\omega)$$
$$= e\frac{J\omega RC - \omega^2}{J\omega RC + 1}(j\omega) = j\omega e\frac{RC + j\omega}{j\omega RC + 1}(j\omega)$$

which when rationalized is:

(22)
$$e_0(j\omega) = j\omega e\bigg[\frac{\omega^2 RC - j\omega R^2 C^2 + RC + j\omega}{\omega^2 R^2 C^2 + 1}\bigg](j\omega)$$

By assigning a special value to $RC$, as above, such that:

$$RC = \frac{1}{RC} = 1$$

(23)
$$e_0\bigg]_{RC=1}(j\omega) = j\omega e(j\omega)$$

Let:

(24)
$$e = E \sin \omega t$$

a voltage proportional to angular displacement.

then:

(25)
$$j\omega e = j\omega e \sin \omega t$$

and:

(26)
$$e_0]_{RC=1} = \omega E \cos \omega t$$

a pure voltage proportional to angular velocity.

Consequently, it is seen that the voltage supplied over the line 22 is truly proportional to the angular velocity as desired. In the adding and coefficient circuitry 26 the signals on the four leads 21, 22, 23 and 24 are added together in a resistance network to provide the desired coefficients in accordance with Equation 5. Also, the pilot command signal $\theta$ is applied over the line 28 into the circuit 26, and the combined result operates the steering mechanism 32.

In the adding and coefficient circuitry 26 there are five isolating amplifiers 71, 72, 73, 74, and 75, for example such as cathode follower isolating stages connected in series with the respective lines 21, 22, 23, 24, and 28, for providing isolation so as to prevent interaction between the various circuits. These isolating amplifier units feed into respective potentiometers 76, 77, 78, 79, and 80 which have their opposite ends connected to a grounded return line 82. The four potentiometers 76–79 are set to various values representing the respective "A" coefficients of the Equation 5 in accordance with the desired steering action as determined to compensate for the characteristics of the particular craft 10 when it is in motion. The potentiometer 80 is adjusted to the desired value for setting the relative strength of the steering command signal. The outputs from these five potentiometers are combined and applied to an output line 84 feeding across an output resistor 86 into the lead 30 to control the operation of the steering mechanism 32.

In summary, it is noted that by using an angular displacement gage and an angular accelerometer, the output voltage of a nearly perfect angular velocity gage can be simulated, even though such a gage does not in fact exist in the system. Moreover, the methods and apparatus of this invention show that in a system including two physical measurement gages, the signal outputs of which are related in a manner such that the output of one is the second time derivative of the other, then the output of a third gage may be simulated which lies in the interval such that its output signal is the time derivative of one and time integral of the other. This is an advantage in simplifying analog computers and control system functions.

From the foregoing it will be understood that the methods and apparatus for gage simulation in automatic control systems described herein as illustrative embodiments of the present invention are well suited to provide the advantages set forth and that all matter hereinbefore set forth or shown in the accompanying drawings is to be interpreted as illustrative and not in a limiting sense and that in certain instances some of the features of the invention may be used without a corresponding use of other features or may be modified into equivalent elements, all without departing from the scope of the invention as defined by the following claims.

What is claimed is:

1. The method of simulating the presence of an angular velocity gage in an automatic guidance control system for a craft comprising the steps of sensing the angular displacement of the craft to provide a first electrical signal, and sensing the angular acceleration of the craft to provide a second electrical signal, differentiating the first electrical signal with respect to a time-constant of unity to provide a third signal, integrating the second signal with respect to a time-constant of unity to provide a four signal, and adding said third and fourth signals to produce a fifth signal as an indication of angular velocity.

2. An angular velocity gage simulation circuit comprising a first and second input terminal, a differentiating circuit connected to said first input terminal, an integrating circuit connected to said second input terminal, said differentiating and integrating circuits each having a time constant of unity and each having an output terminal, a pair of equal resistors connected in series between the output terminal of said differentiating circuit and the output terminal of said integrating circuit, and an output terminal for said simulation circuit at the junction of said resistors.

3. An automatic steering control system for a craft which moves upon or in a fluid medium comprising an angular displacement gage for providing an electrical signal proportional to yaw, an angular accelerometer for providing an electrical signal proportional to angular acceleration, a differentiating circuit connected to the angular displacement gage for differentiating said yaw signal, an integrating circuit connected to said angular accelerometer for integrating said angular acceleration signal, said differentiating and integrating circuits each having an effective RC product of unity, a resistance circuit having a mid-point and being connected between the outputs of said differentiating and integrating circuits, a steering mechanism, and circuit means connecting said steering mechanism to said mid-point.

4. An automatic steering control system for a craft which moves upon or in a fluid medium comprising steering mechanism, an angular displacement gage for providing an electrical signal proportional to yaw, an angular accelerometer for providing an electrical signal proportional to angular acceleration, a differentiating circuit connected to the angular displacement gage for differentiating said yaw signal, an integrating circuit connected to said angular accelerometer for integrating said angular acceleration signal, said differentiating and integrating circuits each having an effective resistance-capacitance product of unity, a resistance circuit having a mid-point and being connected between the outputs of said differentiating and integrating circuits, and adding circuit means connecting said steering mechanism to said angular displacement gage, to said angular accelerometer, and to said mid-point, whereby said steering mechanism is responsive to a combination of said yaw signal, said angular acceleration signal and an angular velocity signal supplied from said mid-point.

5. An automatic steering control system for a craft which moves upon or in a fluid medium comprising steering mechanism for guiding the craft, an angular displacement gage for providing an electrical signal proportional to yaw, an angular accelerometer for providing an electrical signal proportional to angular acceleration, a first differentiating circuit connected to the angular displacement gage for differentiating said yaw signal, an integrating circuit connected to said angular accelerometer for integrating said angular acceleration signal, said differentiating and integrating circuits each having an effective resistance-capacitance product of unity, a resistance circuit having a mid-point and being connected between the outputs of said differentiating and integrating circuits, thereby to provide from said mid-point a signal proportional to angular velocity, a second differentiating circuit connected to said angular accelerometer, for providing a signal proportional to angular jerk, and an adding circuit for combining said yaw, angular velocity, angular acceleration and angular jerk signals, said adding circuit being connected to said steering mechanism.

References Cited by the Examiner
UNITED STATES PATENTS

| | | | |
|---|---|---|---|
| 2,808,999 | 10/1957 | Chenery | 244—77 |
| 2,949,260 | 8/1960 | Smith et al. | 244—77 |
| 3,012,180 | 12/1961 | Finvold | 244—77 |
| 3,077,557 | 2/1963 | Joline et al. | 244—77 |

FERGUS S. MIDDLETON, *Primary Examiner.*